June 10, 1969      T. K. ALLISON      3,449,048
METHOD AND APPARATUS FOR PRODUCING PRECISION SPREADS
Filed Dec. 14, 1967      Sheet 1 of 4
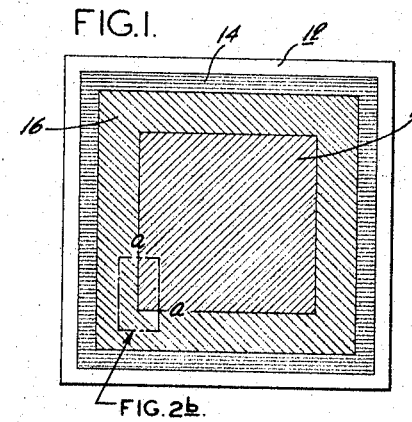
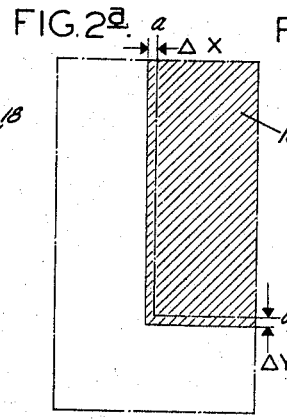
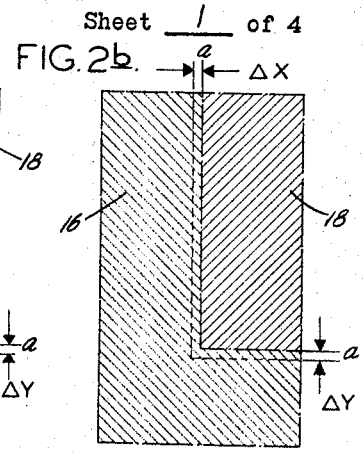
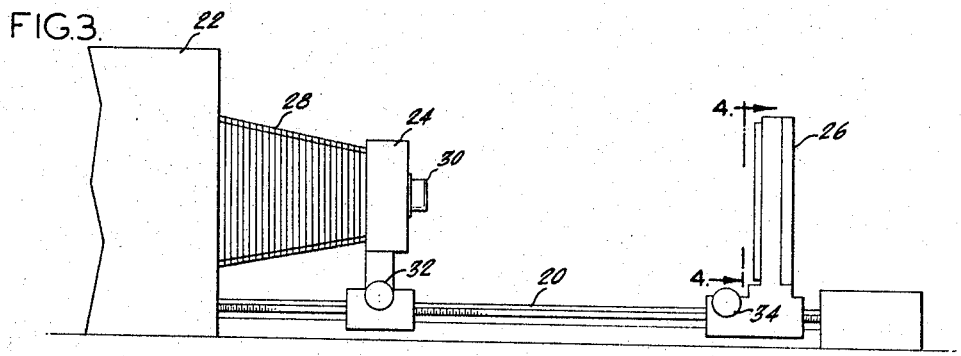
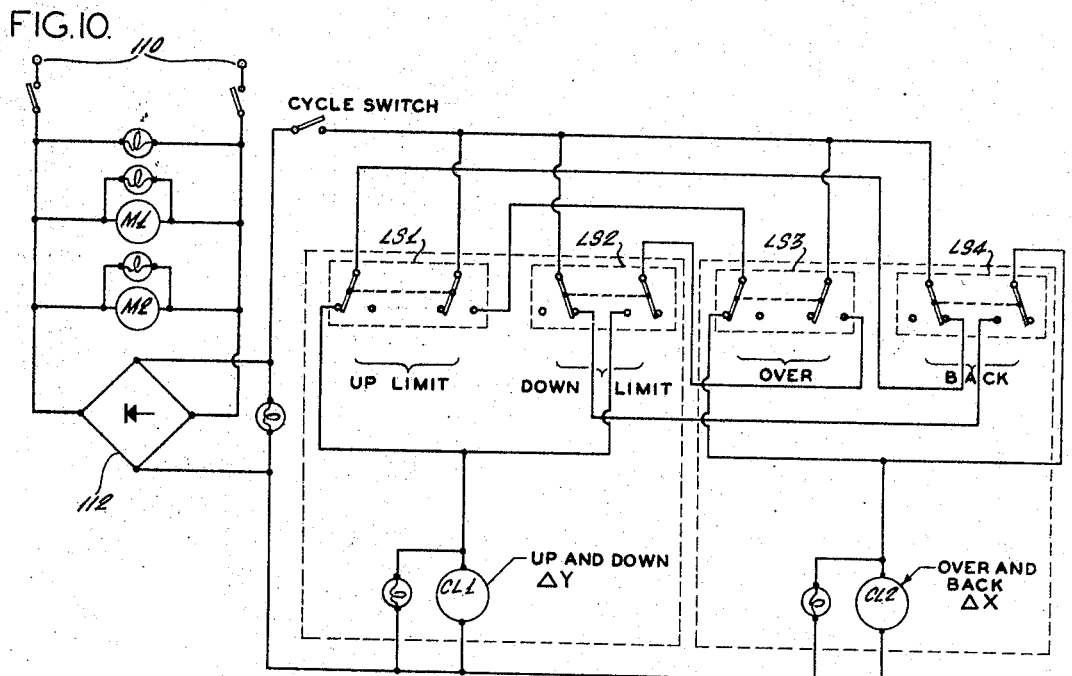
INVENTOR:
THOMAS K. ALLISON
BY Howson & Howson
ATTYS.

June 10, 1969 T. K. ALLISON 3,449,048
METHOD AND APPARATUS FOR PRODUCING PRECISION SPREADS
Filed Dec. 14, 1967 Sheet 2 of 4
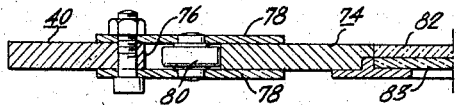
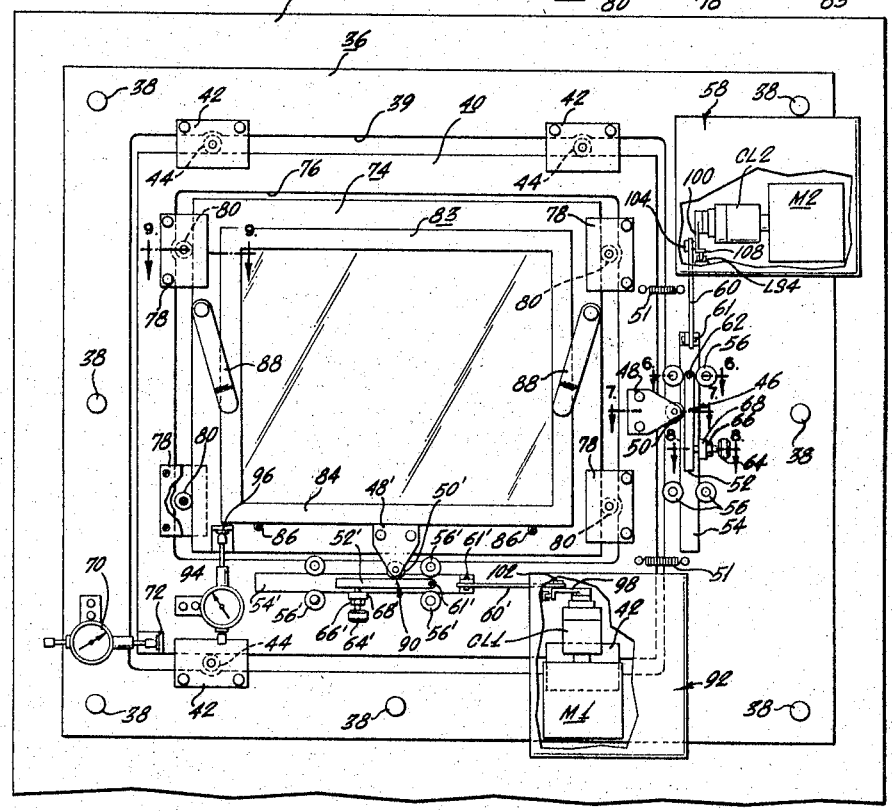
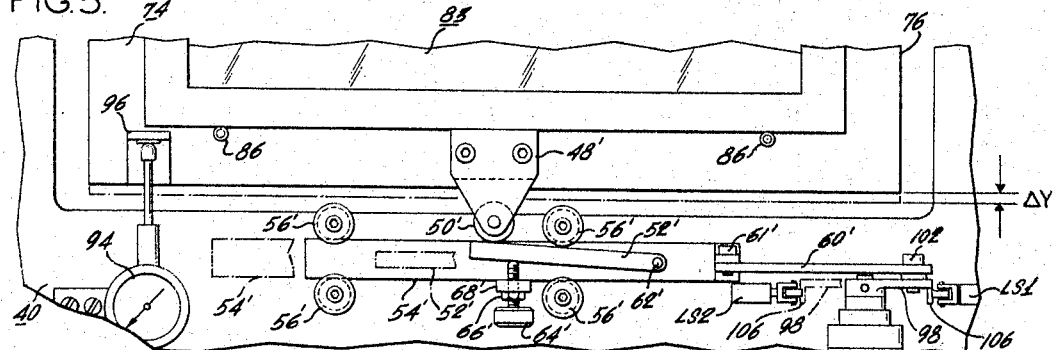
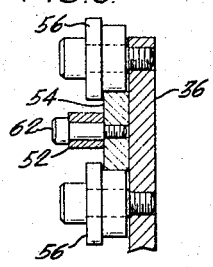
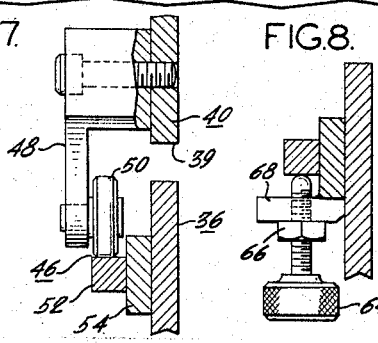
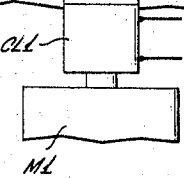
INVENTOR:
THOMAS K. ALLISON
BY Howson & Howson
ATTYS.

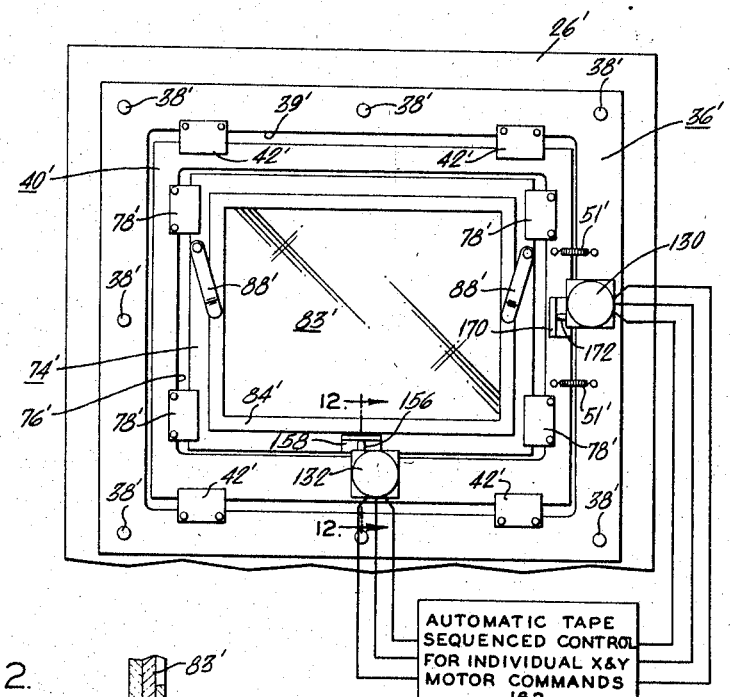

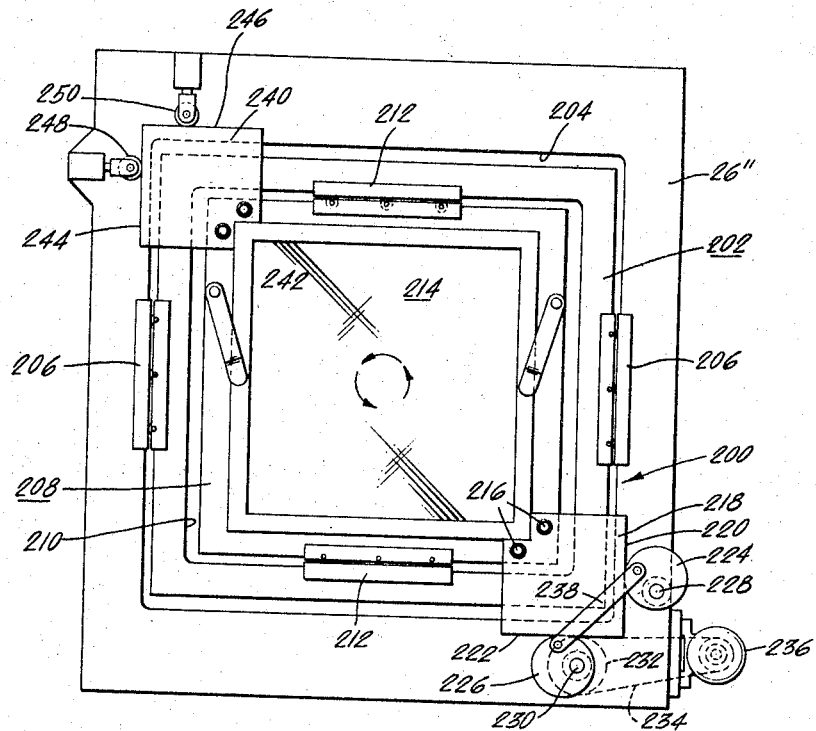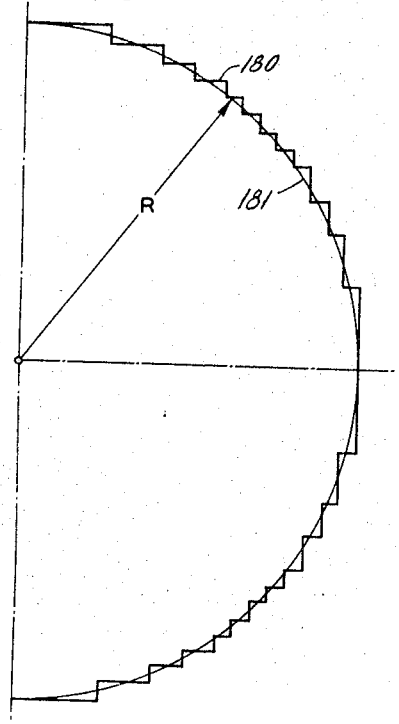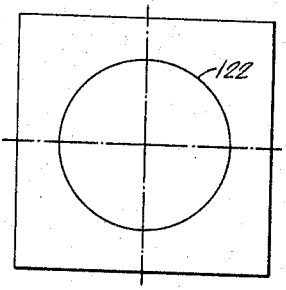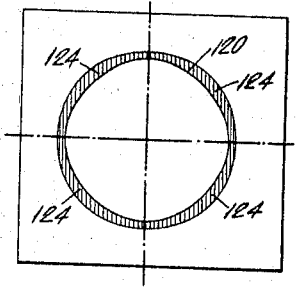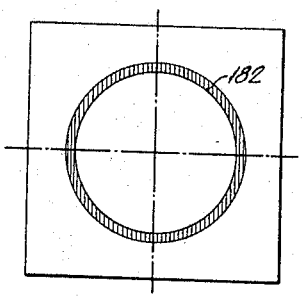
INVENTOR:
THOMAS K. ALLISON 3,449,048
METHOD AND APPARATUS FOR PRODUCING PRECISION SPREADS
Thomas K. Allison, Moorestown, N.J., assignor to The Beck Engraving Company, Inc., Philadelphia, Pa., a corporation of Pennsylvania
Continuation-in-part of application Ser. No. 445,389, Apr. 5, 1965. This application Dec. 14, 1967, Ser. No. 701,802
Int. Cl. G03b 27/52
U.S. Cl. 355—40     13 Claims

ABSTRACT OF THE DISCLOSURE

A method of making a precision spread from a negative which comprises photographing the negative while providing a predetermined planar movement of the negative. Apparatus for carrying out the method includes an attachment for a process camera copyholder which automatically provides a predetermined planar movement of the negative in either a rectilinear or circular path.

---

The present application is a continuation-in-part of my application Ser. No. 445,389, filed Apr. 5, 1965 which now stands abandoned.

The present invention relates to a method and apparatus for making precision spreads from negatives employed in the production of multi-colored printing plates.

In the multi-color printing of type and line work, due to the unavoidable vibration and movement of the printing plates or cylinders, it is necessary to provide a slight overlap of adjoining colors to prevent unprinted gaps therebetween. This overlap is known as "spread" and the amount of spread for a particular plate is not uncommonly specified to the thousandth of an inch. The spread that may be required varies widely depending on a number of factors such as the relative position that the plate will occupy in the press.

An engraver, upon receiving a multi-color work, prepares a black and white transparency from which negatives are made for each of the dye colors to be used. The preparation of the composite negative for each color from which the printing plate is made is known as "stripping" and by means of registry marks the various negative portions which have been spread or otherwise altered are assembled. It is generally necessary to sperad only portions of the negative. Half-tone areas cannot of course be spread and are blacked out during this operation. Printing plates are then made from the negatives, the plates by virtue of the spreads having a built-in compensation for registration inaccuracies in the printing operation.

The obtaining of the specified spread has heretofore been largely a matter of trial and error. A number of methods making spreads have been employed, but none of these provides the precision and speed of the present invention. A commonly employed method is the use of a point light source to expose a film having the negative spaced therefrom by a thin sheet of Celluloid such that a slightly enlarged image is projected on the film. Such an arrangement does not provide a uniform spread since the light flaring outwardly from a point produces a more pronounced spread at the edges than at the center of the film. A more serious disadvantage is the difficulty with such a system of accurately controlling the amount of spread. It may for example require half a day's work to reach the required spread by trail and error steps.

A modification of this system is is the use of a revolving light source above the negative to reduce the objectionable flaring effect described. However, the flaring effect is not completely eliminated and this system suffers from the primary disadvantage of being a time consuming trial and error method.

A more complicated and expensive approach to the problem of producing a precise spread involves the use of a refracting device adjacent the lens of a process camera which is simultaneously rotated and oscillated to provide a predetermined spread of a negative. Such a device, due to its proximity to the camera lens, is ultra-sensitive and to effect a spread accuracy of one one thousandth of an inch, an adjustment of one ten-thousandth of an inch of the refracting device might be required. In practice, such close adjustment cannot initially be achieved and this method essentially is as much of a trial and error process as the less intricate systems previously described. Furthermore the refraction and hence the spread is not uniform due to the greater angle of the edge regions of the negative to the refracting device.

In recognition of the shortcomings of previous methods, recent attempts have been made to utilize exposure and development techniques to effect the specified spread. By its nature such a process requires trial and error steps and cannot be considered an improvement over previous methods.

The present invention involves an arrangement whereby a negative mounted on the copyboard of a process camera is moved through a predetermined rectilinear or circular path during exposure of a film. Since the path of movement can be accurately controlled, the precise spread desired may be obtained at once without the trial and error steps which have been the principal drawback of prior methods.

It is accordingly a first object of the present invention to provide a method and apparatus for quickly and accurately producing precision spreads without resort to trial and error steps.

A further object of the invention is to provide a method and apparatus as described which produces a uniform spread regardless of the size of the negative.

An additional object of the invention is to provide a method as described which may be carried out on a conventional process camera by means of an attachment mounted on the copyholder thereof.

A still further object of the invention is to provide an attachment for a process camera for carrying out the described method which is relatively inexpensive to construct and which may be readily operated by a cameraman without additional training or experience.

Still another object of the invention is to provide an attachment for a process camera as described which operates in a completely automatic manner to produce a preselected spread.

Additional objects and advantages of the invention will be more readily apparent from a consideration of the following detailed description of embodiments thereof when taken together with the accompanying drawings in which:

FIG. 1 is a view of a multi-color art work having adjoining color areas;

FIGS. 2a and 2b are enlarged views of the portions of the art work of FIG 1 enclosed in broken lines illustrating the spread desired along the juncture of two adjoining color areas;

FIG. 3 is a side elevational view showing a process camera of a conventional type which is provided with a spread attachment embodying the present invention;

FIG. 4 is a view taken along line 4—4 of FIG. 3 showing the attachment mounted on the copy board of the process camera;

FIG. 5 is an enlarged fragmentary view of the attachment shown in FIG. 4 in the position in which the attachment may be adjusted to provide a predetermined spread;

FIG. 6 is a sectional view taken along line 6—6 of FIG. 4;

FIG. 7 is a sectional view taken along line 7—7 of FIG. 4;

FIG. 8 is a sectional view taken along line 8—8 of FIG. 4;

FIG. 9 is a sectional view taken along line 9—9 of FIG. 4;

FIG. 10 is a diagram of the electrical circuit employed for automatically controlling the attachment of FIGS. 3–9;

FIG. 11 is an elevational view showing a modified form of attachment mounted on the copy board of a process camera;

FIG. 12 is a view partly in section taken along line 12—12 of FIG. 11 and showing details of the stepping motor drive thereof;

FIG. 13 is a view taken along line 13—13 of FIG. 12 showing the magnetic switch control arrangement of the stepping motor;

FIG. 14 is a sectional view taken along line 14—14 of FIG. 12 showing further details of the stepping motor drive;

FIG. 15 is a schematic illustration of the stepped path which may be provided by the embodiment of FIGS. 11–14 to simulate a circular spread motion;

FIG. 16 is a view showing a further modified attachment for the copyboard of a process camera which is arranged to provide a circular motion of the negative holder for the spreading of circular or curved art work configurations;

FIG. 17 is an illustration of a simple piece of art work having a circular configuration;

FIG. 18 is an illustration of the spread of the art work of FIG. 17 which would be produced using a square pattern of negative movement; and FIG. 19 is an illustration of the spread of the art work of FIG. 17 which can be obtained using either the stepped simulated circular spread movement shown in FIG. 15 or the circular spread attachment shown in FIG. 16.

Referring to the drawings, FIG. 1 shows a piece of art work 12 having three different adjoining color areas 14, 16 and 18. In printing a reproduction of the art work, a separate printing plate is utilized to apply a dye corresponding to each of the three colors. Because of the difficulties inherent in registering and maintaining in register the several printing plates, it is a common practice to spread one of two adjoining colors to insure that there are no unprinted areas between the colors.

FIG. 2b shows an enlarged portion of the art work 12 including the boundary a—a between the colors 16 and 18 and illustrates a typical spread of the color 18 which is designated X and Y respectively in the horizontal and vertical directions. In reproducing the art work, the color 18 is printed first with spread edges as shown in FIG. 2a. The color 16 is then printed, with the edges thereof overlapping the spread areas of color 18. Since opaque dyes are generally employed, the spread areas are hidden excepting those portions exposed by registration inaccuracies of the plates. As noted above, the amount of spread may be specified to the thousandth of an inch with the same spread generally being required in both the horizontal and vertical directions.

As described briefly above, the present method is particularly adapted for use on a process camera such as that shown in FIG. 3. The process camera is of a conventional type and includes the camera bed 20 extending from the camera back 22 and upon which are movably mounted the lens holder 24 and the copy holder 26. The usual bellows 28 is provided connecting the lens holder with the camera back and a suitable lens 30 is mounted on the lens holder 24. The lens holder and copy holder are movable along the camera bed 20 by means of hand wheels 32 and 34.

The embodiment of the present invention shown in FIGS. 3–10 consists of an attachment which is mounted on the copy holder 26. As shown in FIG. 4, the attachment comprises a base plate 36 attached to the copy holder 26 by screws 38 and having a substantially square aperture 39 therein. An outer frame 40 which is somewhat smaller than the aperture 39 is supported within the aperture for sliding horizontal movement by the guide plates 42 secured to the base plate 36 and having roller means 44 bearing against the upper and lower edges of the outer frame. The horizontal movement of the outer frame is effected by an adjustable reciprocating cam means 46 and spring means disposed along one side edge thereof.

Extending from a side edge of the outer frame 40 is the roller arm 48 supporting the roller 50 as shown in FIG. 7. The roller 50 is urged by return springs 51 extending between the outer frame and base plate against an adjustable cam bar 52 carried by the cam bar holder 54. As shown in FIG. 6, the cam bar holder 54 is slidably mounted between the spaced flanged rollers 56 for vertical movement on the base plate 36. The cam bar holder 54 is driven in a reciprocating manner described hereinafter by the actuator 58 by means of the connecting arm 60 pivotally connected thereto by the pin 61.

The cam bar 52 is pivotally mounted at one end thereof by the pin 62 to the cam bar holder. The angular position of the cam bar on the cam bar holder is regulated by means of the adjusting screw 64 threadedly mounted on the arm 68 extending from the cam bar holder, the adjusting screw including a nut 66 for locking the screw in position. A dial indicator 70 is secured to the base plate 36 at the opposite side of the outer frame 40 from the adjustable cam means 46 and a stop 72 on the outer frame in engagement with the indicator arm permits an indication of the extent of horizontal travel of the outer frame. The dial indicators are preferably of a type which can be read to one one-thousandth of an inch.

An inner frame 74 mounted within the aperture 76 of the outer frame 40 is vertically slidable between guide plates 78 attached to the outer frame and roller means 80 thereof as shown in FIG. 9. The inner frame 74 includes the glass backing plate 82 upon which a negative may be mounted by means of the glass cover plate 83, the frame 84 of which is supported upon the pins 86 and secured by the spring clips 88. A conventional light source (not shown) is provided behind the backing plate 82.

Vertical movement of the inner frame 74 is effected by means of an adjustable reciprocating cam means 90 of an identical construction with the cam means 46 previously described and accordingly the same identifying numbers with a prime added are used to identify the corresponding elements thereof. Return springs are unnecessary for the inner frame since the weight of the frame maintains the roller 50' in contact with the cam bar 52'. The cam bar holder 54' is linked by the connecting arm 60' to the actuator 92 which provides a reciprocating movement of the cam bar holder as described more fully below. A dial indicator 94 mounted on the outer frame 40 in contact with a stop 96 on the inner frame provides an exact indication of the extent of vertical movement of the inner frame.

The actuators 92 and 58 are of the same construction and respectively include motors M1 and M2 connected to a power source and driven in continuous rotation during operation of the attachment. Respectively connected to the motors M1 and M2 are electric clutches CL1 and CL2 which are adapted for providing intermittent rotation of the respective crank arms 98 and 100 pivotally attached to the connecting arms 60' and 60 by the pins 102 and 104. Finger 106 projecting downwardly from the crank arm 98 is adapted to contact and actuate the opposed limit switches LS1 and LS2 at the extreme right and left hand travel positions of the cam bar holder 54'. Similarly, finger 108 projecting from crank arm 100 is adapted to actuate opposed limit switches LS3 and LS4 at the extreme upper and lower travel positions of cam bar holder 54.

Referring to the wiring diagram of FIG. 10, the actuator motors M1 and M2 are connected for continuous operation across a source of alternating current 110. The alternating current is converted to direct current by the rectifier 112 to provide a circuit wherein the electric clutches CL1 and CL2 are controlled by the several limit switches. The limit switches as illustrated are of a double pole type and the circuit is arranged so that the closing of a given switch serves to deenergize one of the electric clutches while energizing the other clutch. This arrangement produces a cyclical movement of the inner and outer frames wherein the outer frame is first moved upwardly a given amount as determined by the adjustment of the cam bar 52', the inner frame is then moved to the left an amount determined by the adjustment of the cam bar 52, the outer frame is moved back to its lower limit, and finally the inner frame is moved back to its starting position. Since the motors are running at a constant speed, the time required for each movement and for a full cycle is constant regardless of the amount of movement in either direction.

Considering in detail a cycle of operation of the device, a negative of the line work or type to be spread is mounted between the glass backing plate 82 and the plate 83, the camera is properly focused and film is inserted in the camera back 22. The spread mechanism is advanced to the position at which the crank arms are in contact with the limit switches LS1 and LS3, the extreme positions of vertical and horizontal travel respectively of the cam bar holders 54 and 54', and the amount of spread, which is read directly on the dial indicators 70 and 94 to the thousandth of an inch. With the adjusting screws set at the proper spread, the locking nuts 66 and 66' are tightened and the apparatus is ready for the spread exposure. The light source is energized, the cycle switch closed to start the cyclical movement of the inner and outer frames and the lens shutter opened to begin the exposure of the film.

Considering the cycle to start with the frames in the lower right hand position, the crank arm fingers 106 and 108 will be in contact respectively with the limit switches LS2 and LS4 and these switches are thus initially closed as illustrated in FIG. 10. At the moment the cycle switch is closed, current flowing through the left hand side of switch LS4 and the left hand side of switch LS1 activates the clutch CL1 and starts the movement of the cam bar holder 54' to the right and the consequent upward movement of the outer frame. Immediately upon actuation of the clutch CL1, the crank arm finger 106 moves away from the limit switch LS2 thereby opening the switch. After the crank arm 98 has passed through 180°, it contacts and closes limit switch LS1 thereby deactivating clutch CL1 and allowing current to pass through the right hand side of switch LS1 and the left hand side of switch LS3 to activate clutch CL2.

The movement of crank arm 100 opens switch LS4 and after passing through 180° moving the cam bar holder 54 upwardly to effect movement of the outer frame to the left, the crank arm closes limit switch LS3 thus deactivating clutch CL2. Current then passes through the right hand side of switch LS3 and the right hand side of the now open switch LS2 to activate clutch CL1. Crank 98 moves away from and opens limit switch LS1 and returns the inner frame to its starting position, thereby contacting limit switch LS2 and deactivating the clutch CL1. Current then flows through the left hand side of the closed switch LS2 and through the right hand side of the open switch LS4 to activate the clutch CL2 and effect a return of the outer frame to its right hand starting position, the movement of the crank arm 100 opening switch LS3 and upon passing through 180° closing LS4 to complete the four stage cycle. One limit switch is thus always closed at any point during a cycle and momentarily at the beginning or end point of the cycle, two switches are closed as illustrated.

Although theoretically a single cycle of the attachment would be sufficient to provide the proper spread exposure, in practice it is convenient to provide a number of cycles per exposure such that the exposure time may be varied without changing the actuator motor speeds.

If spread is desired in a single direction only, the appropriate adjusting screw is set such that the respective cam bar provides a zero displacement of the frame involved. It is thus possible with a very simple adjustment to effect either a vertical spread alone or a horizontal spread alone, the mechanism operating cyclically in the same manner as described but producing movement of the negative in a single direction only.

The method described above provides a simple and accurate means for providing a desired spread of rectilinear art work and eliminates the trial and error nature of presently practiced methods. With the process camera set up to produce an image of the same size as the negative on the copy holder, the amount of movement of the negative will be exactly the amount of spread produced on the film. Since this displacement can be accurately controlled to one one thousandth of an inch by means of apparatus such as that illustrated, trials are eliminated and the exact required spread may be produced with the initial set-up.

While the apparatus described above for providing a two dimensional planar movement of the negative during exposure provides an accurate, distortion-free spread of art work formed or bounded by straight lines, when such apparatus is used with curved surfaces which extend through any substantial number of angular degrees, a slight distortion results. An example of the type of distortion created is shown in FIG. 18 which illustrates the spread 120 resulting from the application of the above described method to the circular art work 122 of FIG. 17. It may be seen that the spread 120 is distorted, being enlarged in the regions remote from the X and Y axes of spread movement. This enlargement, designated 124 in the drawings, has been exaggerated in FIG. 18 for purposes of illustration and may in many cases not be objectionable. However, in instances where a precise spread of a curved art work configuration is necessary, such a spread may be executed by means of the modified embodiments of the apparatus described below.

In FIG. 11 is shown a modified form of attachment for a process camera copy holder which is in most respects similar to the attachment described above and illustrated in FIGS. 3-10. Mounted on the copy holder 26' is the attachment base plate 36' by means of screws 38', the base plate 36' having a substantially square aperture 39' therein. An outer frame 40' of a size smaller than the aperture 39' is supported within the aperture for sliding horizontal movement by the guide and bearing elements 42' on the base plate in engagement with the upper and lower edges of the outer frame. The horizontal movement of the outer frame is effected by means of the tape controlled stepping motor 130 mounted on the base plate, details of which are described below. Spring return means 51' are provided to effect the horizontal return of the outer frame.

An inner frame 74' is mounted within the aperture 76' of the outer frame and is of a size somewhat smaller than that of the outer frame aperture. The inner frame is vertically slidable with respect to the outer frame by means of guide and bearing assemblies 78' secured to the outer frame and engaging the side edges of the inner frame. The inner frame carries the glass backing plate 82' upon which a negative may be secured by means of the glass cover plate 83'. The cover plate frame 84' is secured as in the previously described embodiment by means of the spring clips 88'. Vertical movement of the inner frame is provided with respect to the outer frame by means of a tape controlled stepping motor 132 mounted on the outer frame 40'.

The stepping motor drive arrangement for both the motors 130 and 132 is shown in detail in FIGS. 12–14. A drive support element 134 secured to the face of the outer frame 40' supports the motor 132, the motor being bolted in outwardly spaced relation from the element 134 by bolts 136 and spacers 138. The motor drive shaft 140 includes a worm 142 which drives a worm wheel 144 slidably keyed to a transverse shaft 146 journaled in the element 134 by bearings 148 and 150. One end of the shaft 146 is threaded at 152 and is threadedly engaged with a threaded bore 154 of a portion of the element 134 whereby rotation of the worm wheel 144 by the drive shaft worm 142 causes an axial movement of the shaft 146. The worm wheel 144, being slidably keyed to the shaft, is held in a fixed axial position between the bearings 148 and 150. The tip 156 of the shaft 146 adjacent the threaded portion 152 is rounded for bearing against the angle plate 158 secured to the inner frame by screws 160. Rotation of the motor 132 by movement of the shaft 146 causes a controlled vertical movement of the inner frame 74'. Rotation of the motor in one direction will raise the frame, while rotation in the opposed direction will lower it. The weight of the frame on the shaft tip 156 insures a continuous contact of the shaft tip with the frame angle 158.

The starting, stopping and direction of rotation of the motors 130 and 132 are controlled by a tape-sequenced numerical control unit 162 which is of a commercially available type. For example, the numerically controlled 2-axis machine positioning system model NCMS 24–1 manufactured by the Superior Electric Company, Bristol, Conn., although designed for controlling drilling or milling machines, could be readily used for the present device. Such a system employs a pair of synchronous stepping motors which provide a position accuracy within one-thousandth of an inch.

The shafts of each of the motors 130 and 132 is provided with a magnetic rotor 164 as shown in FIGS. 12 and 13 which rotates in the plane of proximity switches 166 and 168 arranged in diametrically opposed relation. The proximity switches are connected with control unit 162 to provide electrical signals indicative of the rotational position of the motors. By choosing a thread size for the threaded portion 152 of shaft 146 having forty threads to the inch, and a twenty-five to one reduction between the worm and worm wheel, one revolution of the motor shaft 140 will provide one thousandth of an inch displacement of the frame. Since the rotor 164 will trip both the proximity switches 166 and 168 during a revolution, the tripping of each switch indicates one-half of one thousandth of an inch displacement of the frame. It is thus a simple matter to program the numerically controlled positioning system to achieve the exact path of movement of the negative desired during the exposure.

The motor 130 and its frame drive arrangement is identical with that of the motor 132 as illustrated in FIG. 12, the outer frame 40' including an angle plate 170 against which the shaft 172 bears to provide a horizontal displacement of the frame. The angle plate 170 is held in engagement with the end of shaft 172 by the springs 51'.

The operation of the embodiment shown in FIGS. 11–14 is essentially the same as that shown in FIGS. 3–10, the negative of the art work to be spread being mounted on the glass backing plate 82' and being moved through a predetermined path during exposure in the process camera. The path of the negative which is programmed on the numerical control system 162 might for example be the stepped path 180 shown in the greatly enlarged schematic view of FIG. 15. In this view a circular path 181 is simulated by a series of successive X and Y steps of varying length, some of which may be as small as one thousandth of an inch. The simulated circular movement illustrated in FIG. 15 may for example have a radius R of only twenty thousandths of an inch and thus the stepped spread edges will not be visible to the human eye. In FIG. 19, the spread 182 of the circular art work 122 of FIG. 17 illustrates the uniform spread which can be effected of curved art work by use of such a programmed stepped path. The embodiment of FIGS. 11–14 can be programmed to accommodate any rectilinear or curved art work configurations. Normally, the curved surfaces are masked while the rectilinear edges are spread and vice versa so that only curved or linear edges are being spread during a given exposure.

A further modified embodiment of the apparatus is shown in FIG. 16 and comprises an attachment generally designated 200 attached to the copy holder 26" of a process camera. The attachment includes an outer frame 202 mounted for vertical movement within the aperture 204 of the copy holder by bearing assemblies 206 along the side edges thereof. An inner frame 208 is mounted within the aperture 210 of the outer frame for sliding horizontal movement by means of bearings 212 at the upper and lower edges thereof. A glass backing plate and cover plate assembly 214 is carried by the inner frame 208 to provide a mounting means for the negative to be spread.

Attached to one lower corner of the inner frame 208 such as by screws 216 is a drive plate 218 having perpendicular edges 220 and 222 which are respectively in contact with the eccentric circular cam members 224 and 226. Cam member 224 is mounted for rotation on shaft 228 on the copy holder while cam element 226 is secured to shaft 230 journaled in the copy holder and having a chain sprocket 232 secured to the other end thereof. A drive chain 234 connects the sprocket 232 with drive motor 236 having a suitable speed reduction means to drive the shaft 230 at a relatively low r.p.m. The cam elements 224 and 226 are linked by the connecting rod 238 to provide a coordinated rotation of both cam members.

A plate 240 similar to plate 218 is attached to the corner of the inner frame opposite the plate 218 by screws 242. Perpendicular surfaces 244 and 246 of the plate 240 are engaged by the hydraulically or spring loaded pressure rolls 248 and 250 respectively, the pressure thereof serving to maintain the edges 220 and 222 of drive plate 218 in engagement with the cam members 224 and 226.

In operation, with a negative of the art work to be spread positioned in the backing plate assembly 214, the motor 236 is energized during exposure of the negative to provide a circular orbital movement of the inner frame and negative. This attachment is best suited to the spreading of art work having arcuate or circular configurations and could for example be employed to produce the spread 182 shown in FIG. 19 from the circular art work configuration 122 of FIG. 17.

The amount of spread produced by the attachment of FIG. 16 is determined by the eccentricity of the cam elements 224 and 226 and adjustment means to permit a rapid accurate adjustment of the spread may be provided on the cam elements.

Manifestly, changes in details of construction can be effected by those skilled in the art without departing from the spirit and the scope of the invention as defined in and limited solely by the appended claims.

I claim:

1. An attachment for a process camera copy holder for use in making a precision spread from a negative, comprising a frame means mounted on the copy holder perpendicular to the camera axis, said frame means being selectively displaceable in a plane perpendicular to the camera axis, said frame means including means for mounting a negative in a plane perpendicular to the camera axis, and means for effecting a predetermined two-dimensional displacement of said frame means during an exposure of a film in the camera.

2. An attachment for a process camera as claimed in claim 1 wherein said means for effecting a predetermined displacement of said frame comprises means for effecting a circular orbital movement of said frame.

3. An attachment for a process camera as claimed in claim 2, wherein said means for effecting a circular orbital movement of said frame comprises a pair of linked eccentric cams operatively engaged with perpendicular surfaces of an extension of said frame.

4. An attachment for a process camera copy holder for use in making a precision spread from a negative, comprising a mounting means on the copy holder for mounting a negative thereon, said mounting means being displaceable in two perpendicular directions in the plane of the copy holder, and means for sequentially effecting a predetermined displacement of said mounting means in each perpendicular direction during an exposure of a film in the camera.

5. An attachement for a process camera copy holder for use in making a precision spread from a negative, comprising a first frame means slidably mounted on said copy holder for movement in a first direction parallel to the copy holder, a second frame means slidably mounted on said first frame means for movement in a second direction perpendicular to said first direction and parallel to the copy holder, said second frame means including means for mounting a negative thereon parallel to the copy holder, and means for effecting a predetermined sequential movement of said first and second frame means during an exposure of a film in said camera.

6. An attachment for a process camera as claimed in claim 5 wherein said means for effecting a sequential movement of said first and second frame means comprises cam means associated with said frame means, and actuator means connected to said cam means.

7. An attachment for a process camera as claimed in claim 5, wherein said means for effecting a sequential movement of said first and second frame means comprises a stepping motor operatively connected to each said frame means to provide movement thereof, and control means for automatically controlling said stepping motors.

8. An attachment for a process camera as claimed in claim 7, wherein the stepping motor for actuating said first frame means is mounted on said copy holder and the stepping motor for actuating said second frame means is mounted on said first frame means.

9. The method of making a precision spread from a negative which comprises the steps of moving the negative at a uniform rate a predetermined distance in a direction parallel with the plane of the negative, and photographing the entire negative during said movement thereof.

10. The method of making a precision spread from a negative which comprises the steps of moving the negative in a predetermined two-dimensional path in the plane of the negative, and photographing the entire negative during said movement thereof.

11. The method claimed in claim 10 wherein said negative is moved in incremental successive steps alternately in perpendicular directions during the exposure.

12. The method as claimed in claim 10 wherein the negative is moved in a continuous circular orbital path during exposure.

13. The method of making a precision spread from a negative which comprises photographing the entire negative while sequentially moving the negative at a uniform rate predetermined distances in each of two perpendicular directions parallel with the plane of the negative and in the same sequence returning the negative in each direction whereby the negative is moved through a rectangular path during the exposure.

References Cited

UNITED STATES PATENTS 3,115,081   12/1963   Bruce _____ 88—24 X
3,126,809   3/1964   Adams et al. _____ 88—24 X NORTON ANSHER, *Primary Examiner.*

R. A. WINTERCORN, *Assistant Examiner.*

U.S. Cl. X.R.

355—75, 95